Figure 1:
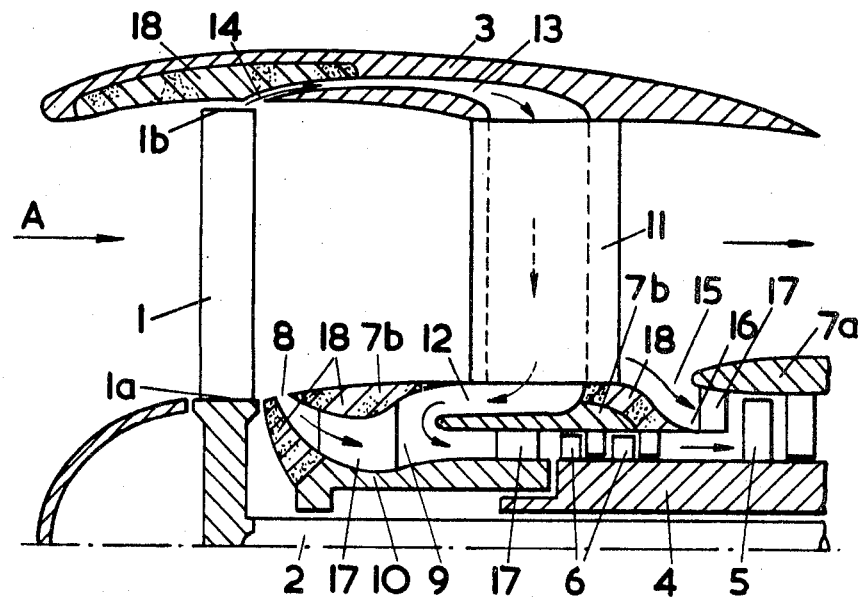

United States Patent [19]

Howell

[11] 3,735,593
[45] May 29, 1973

[54] DUCTED FANS AS USED IN GAS TURBINE ENGINES OF THE TYPE KNOWN AS FAN-JETS

[75] Inventor: Alun Raymond Howell, Cove, Farnborough, England

[73] Assignee: Minister of Aviation Supply in Her Britannic Majesty's Government of the United Kingdom of Great Britain and Northern Ireland, London, England

[22] Filed: Feb. 11, 1971

[21] Appl. No.: 114,469

[30] Foreign Application Priority Data

Feb. 11, 1970 Great Britain.................6498/70

[52] U.S. Cl..................60/226, 415/115, 415/144
[51] Int. Cl...............................................F02k 3/04
[58] Field of Search......................415/79, 115, 119, 415/144, DIG.1; 60/226

[56] References Cited

UNITED STATES PATENTS

| 2,692,724 | 10/1954 | McLeod | 60/226 |
| 2,848,155 | 8/1958 | Hausmann | 415/144 |
| 2,618,433 | 11/1952 | Loos et al. | 415/115 |
| 3,494,129 | 2/1970 | Krebs et al. | 415/144 |
| 3,572,960 | 3/1971 | McBride | 415/DIG. 1 |
| 3,447,741 | 6/1969 | Hayette | 415/DIG. 1 |
| 3,632,223 | 1/1972 | Hampton | 415/144 |

Primary Examiner—Al Lawrence Smith
Assistant Examiner—Warren E. Olsen
Attorney—Cameron Kerkam and Sutton, Stowell & Stowell

[57] ABSTRACT

A ducted fan having more than one blade row has bleed means adjacent the tips of the blades in at least one upstream blade row. The bleed means are preferably connected by passages to a compressor, the compressor being separate from but driven by a gas generator with which the ducted fan is combined to provide a fan jet engine. Alternative forms of the invention also have bleed means adjacent the roots of the blades in at least one upstream blade row, and there may also be bleed means adjacent the trailing edges of the blades in such rows.

14 Claims, 6 Drawing Figures

DUCTED FANS AS USED IN GAS TURBINE ENGINES OF THE TYPE KNOWN AS FAN-JETS

This invention relates to ducted fans as used in gas turbine engines of the type known as fan-jets.

In such engines only a proportion of air passing through the fan passes through the gas generator. It is usually found necessary, to minimize swirl in the air leaving the fan, to have a stator blade row associated with each fan rotor row. In passing each blade row turbulence is imparted to the airflow, and this turbulence interacts with any downstream blade row to create noise which contributes significantly to total engine noise. One form of turbulence is vortices which issue from the tips and roots of the blades, and reducing these vortices will reduce the total engine noise. Reducing the vortices will also improve the efficiency of the fan, though the efficiency of the engine will also be affected by the power used to reduce the vortices, and the net result may be adverse to overall engine efficiency. Most of the benefit will follow from reducing the vortices at the tips of the blades.

It is an object of this invention to reduce tip and, in some cases, root vortices extending from upstream blade rows in the fan section of a fan jet engine.

According to the invention, a ducted fan having more than one blade row in the fan section has bleed means adjacent tips of blades in at least one upstream blade row.

According to another form of the invention, a ducted fan having more than one blade row in the fan section has bleed means adjacent roots and tips of blades in at least one upstream blade row.

In the application of the invention to fan jet engines the bleed means are connected to passages preferably leading to a compressor. Bleed passages from the blade tips may pass through hollow stator blades, and the compressor may be driven by and exhaust into the gas generator.

Air may also be drawn from orifices adjacent the trailing edges of the blades to reduce trailing edge vortices.

Some embodiments of the invention will now be described, by way of example only, with reference to the accompanying drawings, FIGS. 1 to 6, each of which illustrates diagrammatically and in section a different fan and compressor system for a fan jet engine. Where appropriate, like parts in the figures are referred to by the same reference numbers.

FIG. 1 shows a fan jet engine having a circumferential row of fan rotor blades, such as that shown at 1. Each rotor blade 1 has a root 1a and a tip 1b, is mounted on one end of a shaft 2, and is rotatable within a cylindrical duct defined by an annular shroud casing 3. A second rotatable shaft 4, coaxial with and surrounding the shaft 2, carries at one end a primary compressor, indicated by a row of rotor blades 5, and a secondary compressor indicated by the rows of rotor blades 6. At the other ends of the shafts 2, 4 are turbine units. Between the primary compressor as indicated by the row of rotor blades 5 and the turbine units lie combustion units, the combination of compressor, combustion units and turbine units constituting a gas generator.

The primary and secondary compressor units are surrounded by two sections 7a and 7b respectively of a cylindrical casing. The radially outer surface of the casing 7b is substantially aligned with the roots 1a of the fan rotor blades 1. Between the roots 1a and the casing 7b is an annular inlet 8 which leads to a passage 9 defined by the inner surface of the casing section 7b and a secondary structure 10. The passage 9 leads to the secondary compressor.

Downstream, relative to the direction of normal flow through the duct as indicated by the arrow A, of the row of fan rotor blades 1, secured between the casing 3 and the casing section 7b, is a row of hollow stator blades such as that shown at 11. The hollow interiors of the stator blades are connected by outlet passages such as that shown at 12 to the passage 9, and by inlet passages such as that shown at 13 to an annular inlet 14 which is positioned in the radially inner surface of the casing 3 adjacent the tips 1b of the fan rotor blades 1. Downstream of the row of stator blades 11, and separating the casing sections 7a, 7b is an annular inlet 15 which gives access via a passage 16 to the primary compressor. Rows of guide vanes such as those indicated at 17 guide air flowing through the passages 9, 16 onto the compressor rotor blades 6, 5.

To assist in reducing noise, various parts of the engine, as shown at 18, may be made of silencing material, such as perforated panels or porous sheets backed by honeycomb structures to form single or multiple sandwiches.

In operation, the secondary compressor draws air from the boundary layer adjacent the roots 1a and tips 1b of the fan rotor blades, thus reducing the vorticity at these points. From the secondary compressor, air passes to the primary compressor, where it is joined by more air from the inlet 15. The gas generator functions in the normal manner.

Figure 2:
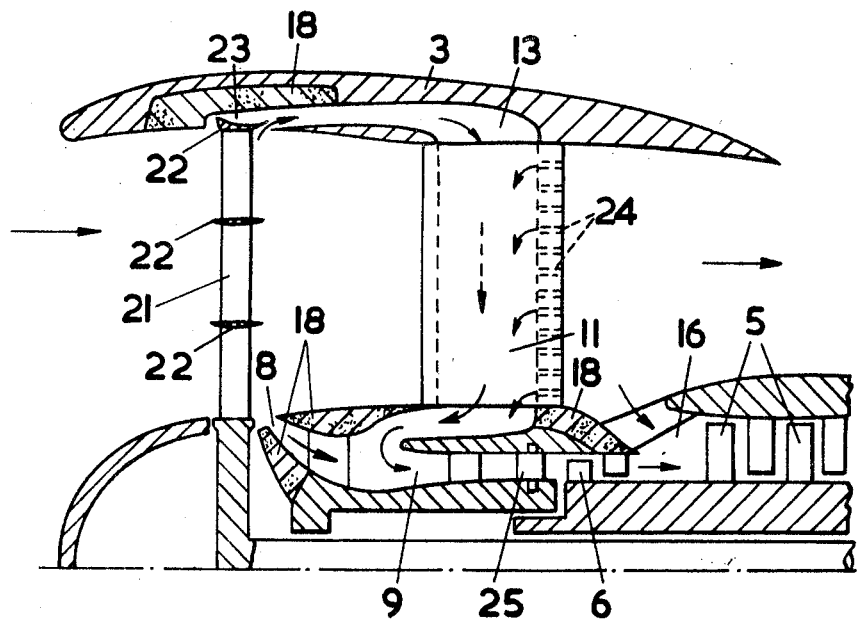

The arrangement shown in FIG. 2 differs from that shown in FIG. 1 in that it has a row of narrow chord rotor blades, as shown at 21, connected together by a number of annular shrouds 22. The outer-most shroud 22 lies in a recess 23 in the cylindrical casing 3, and the recess 23 connects with the passage 13. Each stator blade 11 has, adjacent its trailing edge, one or more orifices 24 connecting with the hollow interior. A final difference from the arrangement of FIG. 1 is, in the passage 9, a plurality of variable inlet guide vanes such as that shown at 25, the disposition and degree of movement of these vanes being such that the passage 9 may be completely sealed off. As in FIG. 1, the rotor blades 21 are mounted on the outer end of fan rotor shaft 2 while the primary and secondary compressor blades 5 and 6 are mounted on the outer end of shaft 4. The other ends of shafts 2 and 4 are connected to turbine units which, in combination with the compressor and combustion units, constitute the gas generator.

In operation, the arrangement of FIG. 2 functions in a similar manner to that of FIG. 1 when the vanes 25 are positioned to leave the passage 9 open, with the addition that air is also drawn through the orifices 24, thus effecting a degree of boundary layer control and reducing the strength of the trailing edge vortices which leave the stator blades 11. When the passage 9 is sealed by the vanes 25, which may be desirable during cruising flight and on occasions when noise reduction is not of importance, the gas generator will receive all its air through inlet 15.

Figure 3:
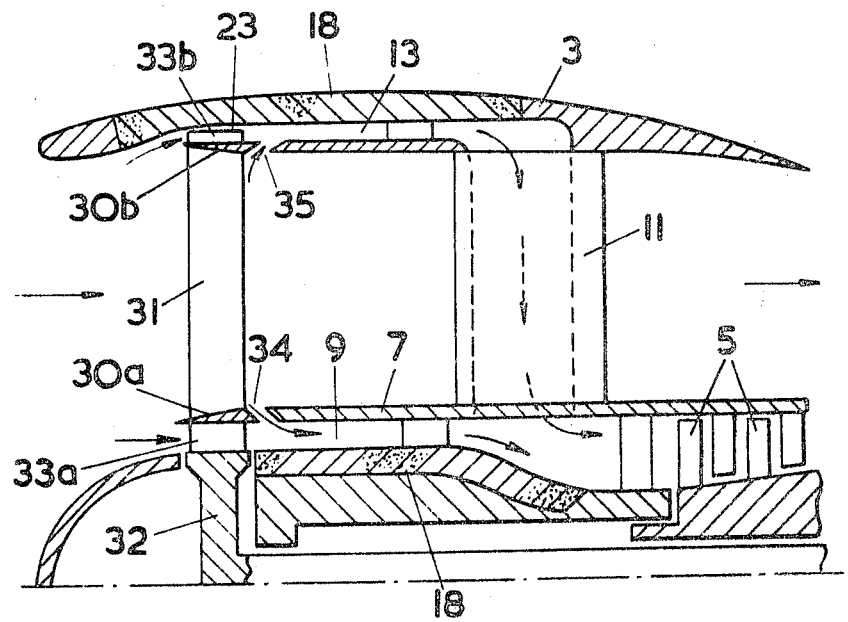

FIG. 3 shows an arrangement having a row of fan rotor blades 31 connected to annular shrouds 30a at the roots and 30b at the tips. Connecting the shroud 30a to a rotor disc 32 are compressor blades such as that shown at 33a, and mounted on the shroud 30b are compressor blades such as that shown at 33b. The shroud 30a is rotatable in substantially the same circumferential arc as an inner casing 7, there being an annular gap 34 between the shroud and the casing. It will be seen that the blades 33a are thus aligned with a passage 9. Similarly the blades 33b lie in a recess 23 in an outer casing 3 such that they are aligned with a passage 13 in the outer casing, there being an annular gap 35 between the shroud 30b and the inner face of the casing 3. The passage 13 connects, via hollow stator blades 11, with the passage 9. The passage 9 leads to a compressor 5, and all the air supply to the gas generator is supplied through the passage 9, there being no inlet similar to the inlet 15 of the arrangement shown in FIG. 1.

In operation the pressure rise across the fan blades 31 will be greater than that across the compressor blades 33a, 33b, and boundary layer air will thus bleed through the gaps 34, 35 into the passages 9, 13. Preferably, there should be more compressor blades 33b than fan blades 31, in order to improve work capacity to help overcome the pressure losses in the hollow stator blades 11.

Figure 4:
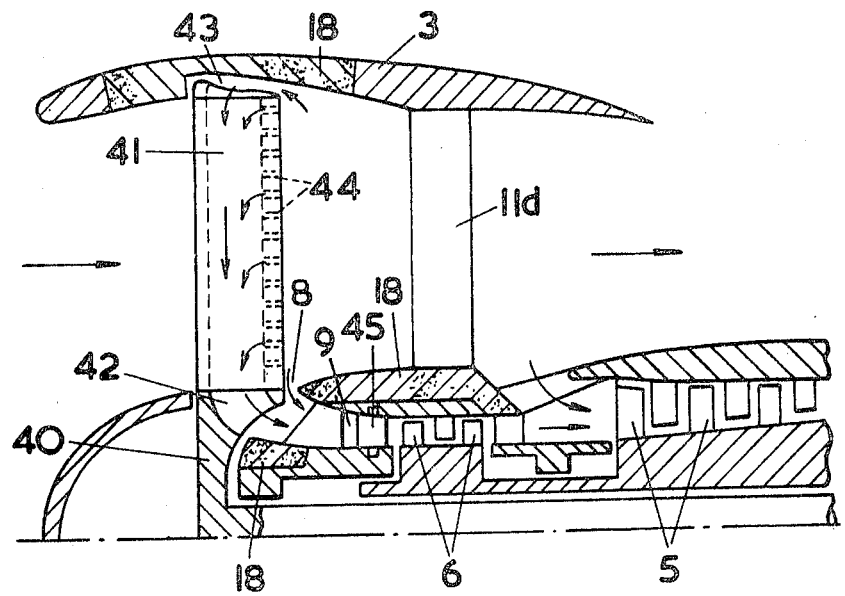

The arrangement shown in FIG. 4 has hollow open ended fan blades such as that shown at 41, the tips of the blades lying in a recess 43 in an outer casing 3. Orifices 44 adjacent the trailing edges of the blades 41 connect with the hollow interior. The hollow interiors of the blades 41 are connected to a passage 9 by passages 42 in the rotor disc 40. Stator guide blades 11d are in this case solid. Otherwise, this arrangement is similar to that shown in FIG. 2, variable inlet guide vanes 45 being provided in the passage 9 to enable this passage to be closed when required.

Operation is similar to that of the arrangement shown in FIG. 2, with the difference that the boundary layer adjacent the tips of the rotor blades 41 is drawn into the open ends of the blades. Also blade boundary layer air is drawn through the orifices 44, giving blade boundary layer control.

Figure 5:
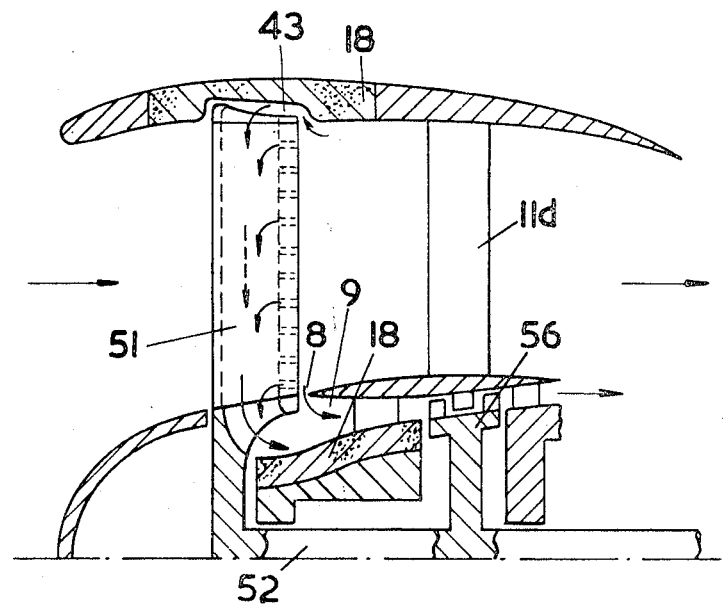

The arrangement shown in FIG. 5 differs from that shown in FIG. 4 only in that a secondary compressor 56 is mounted on the same shaft 52 as the hollow fan rotor blades 51. (In the arrangement shown in FIG. 4 the secondary compressor is on the same shaft as the primary compressor.) As the rotational speed of the fan is less than that of the primary compressor (not shown) the radius of the blade annulus of the secondary compressor 56 is made as large as possible to give a sufficiently high peripheral blade speed.

Figure 6:
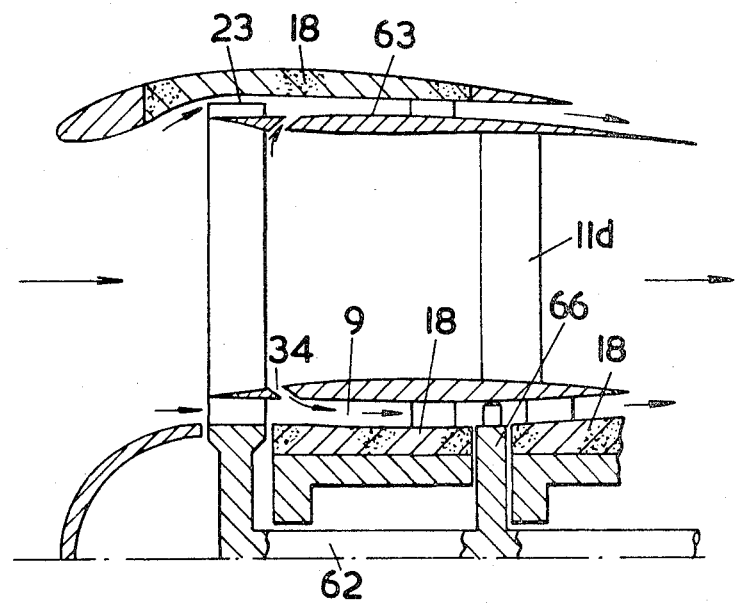

The arrangement shown in FIG. 6 is similar to that shown in FIG. 3 with the following differences:
a. The air from the blade tips is passed to atmosphere through an annular diffusing passage 63, and
b. an additional auxiliary compressor stage 66 is mounted on a fan rotor shaft 62, and rotates in the passage 9.

It should be understood that although the above embodiments of the invention are all front fan gas turbine engines, and have single row fan rotors with a stator row downstream of the rotor, the invention is not limited to such arrangements. For example, it may be applied to aft fan and other arrangements, and to engines having multi-stage fan rotors, and in cases where the most upstream blade row is a stator.

It should also be understood that the Figures are diagrammatic. Such factors as the disposition and number of primary compressor stator guide blades such as those shown at 17 in FIG. 1, and the number of secondary compressor rotor rows, are matters of detail design for any particular engine. Although the primary compressors as shown are single shaft systems, multi-shaft compressors may be used. The fan rotor may be driven by a turbine disc on its mounting shaft, or by a gear box driven by a turbine of the gas generator.

The Figures and descriptions given refer to arrangements wherein there are bleed means adjacent both tips and roots of fan blades, as this is the most complicated form of the invention. It will be apparent, however, that these arrangements may be simply adapted to allow for bleed means only at the tips of fan blades.

What I claim is:

1. In combination with a gas turbine engine of the type known as a fan-jet engine having a gas generator, a ducted fan comprising:
   at least one row of rotor blades mounted on a fan rotor shaft,
   at least one row of stator blades, at least some of which are hollow,
   an annular shroud enclosing said rows of rotor and stator blades and forming a duct for the passage of air,
   said rotor blades and said stator blades being axially spaced apart relative to the axis of the fan rotor shaft,
   annular bleed means adjacent the radially outermost tips of the blades of at least one upstream blade row,
   and a bleed compressor having an inlet and passages extending through said hollow stator blades connecting said bleed means adjacent said radially outermost tips to said inlet of said bleed compressor.

2. A ducted fan as claimed in claim 1 wherein a rotor of said bleed compressor is connected so as to be directly driven by said gas generator.

3. A ducted fan as claimed in claim 2 wherein a rotor of said bleed compressor is mounted on said fan rotor shaft.

4. A ducted fan as claimed in claim 3 wherein a rotor of said bleed compressor is mounted on said fan rotor shaft.

5. A ducted fan as claimed in claim 1 further comprising a passage forming the inlet of said bleed compressor, and a plurality of variable guide vanes in said passage whereby the flow area of said passage can be varied.

6. A ducted fan as claimed in claim 1 further comprising bleed means adjacent the trailing edges of the blades of at least one blade row.

7. In combination with a gas turbine engine of the type known as a fan-jet engine having a gas generator, a ducted fan comprising:
   at least one row of rotor blades mounted on a fan rotor shaft,
   at least one row of stator blades, at least some of which stator blades are hollow,
   an annular shroud enclosing said rows of rotor and stator blades and forming a duct for the passage of air,
   said rotor blades and said stator blades being axially spaced apart relative to the axis of the fan rotor shaft, annular bleed means adjacent the radially outermost and the radially innermost tips of the blades of at least one upstream blade row, a bleed compressor having an inlet, passages connecting said bleed means adjacent said radially innermost tips to said inlet of said bleed compressor, and passages extending through said hollow stator blades connecting said bleed means adjacent said radially outermost tips to said inlet of said bleed compressor.

8. A ducted fan as claimed in claim 7 wherein said gas generator has at least one compressor, and in which said bleed compressor is connected to exhaust into one of said compressors of said gas generator.

9. A ducted fan as claimed in claim 8 wherein a rotor of said bleed compressor is connected so as to be directly driven by said gas generator.

10. A ducted fan as claimed in claim 9 wherein a rotor of said bleed compressor is mounted on said fan rotor shaft.

11. A ducted fan as claimed in claim 8 wherein a rotor of said bleed compressor is mounted on said fan rotor shaft.

12. A ducted fan as claimed in 8 further comprising a passage forming the inlet of said bleed compressor, and a plurality of variable guide vanes in said passage whereby the flow area of said passage can be varied.

13. A ducted fan as claimed in claim 7 wherein said bleed means comprises an annular diffusing passage in said annular shroud, leading downstream from adjacent said radially outermost tips to atmosphere.

14. A ducted fan as claimed in claim 7 further comprising bleed means adjacent the trailing edges of the blades of at least one blade row.

* * * * *